United States Patent [19]

Gero et al.

[11] Patent Number: 5,139,154

[45] Date of Patent: Aug. 18, 1992

[54] WEAR SCREEN PLATE AND METHOD OF MANUFACTURE THEREOF

[75] Inventors: William A. Gero; Frank J. Paskowski, Jr., both of Pittsfield, Mass.

[73] Assignee: Beloit Corporation, Beloit, Wis.

[21] Appl. No.: 457,458

[22] Filed: Dec. 27, 1989

[51] Int. Cl.⁵ .......................... B07B 1/18; B07B 1/46; B23P 25/00

[52] U.S. Cl. .................................. 209/273; 29/163.8; 209/397

[58] Field of Search ............... 209/273, 305, 306, 397, 209/406; 29/163.8

[56] References Cited

U.S. PATENT DOCUMENTS

| | | | |
|---|---|---|---|
| 140,166 | 6/1873 | Robertson | 29/163.8 X |
| 1,207,808 | 12/1916 | Steps | 209/397 X |
| 1,271,787 | 7/1918 | Smith | 209/397 UX |
| 2,827,169 | 3/1958 | Cusi . | |
| 3,664,502 | 5/1972 | Nichols, Jr. | 209/397 |
| 3,680,696 | 8/1972 | Morin | 209/273 X |
| 4,855,038 | 8/1989 | LeBlanc | 209/273 |
| 4,932,112 | 6/1990 | Tikkanen | 29/163.8 |
| 4,954,249 | 9/1990 | Gero et al. | 209/397 X |
| 5,023,986 | 6/1991 | Gero et al. | 209/273 X |

FOREIGN PATENT DOCUMENTS

| | | | |
|---|---|---|---|
| 3733928 | 4/1988 | Fed. Rep. of Germany . | |
| 2200944 | 4/1974 | France | 209/397 |
| 0780906 | 11/1980 | U.S.S.R. | 209/397 |
| 0519680 | 4/1940 | United Kingdom | 209/397 |

*Primary Examiner*—Michael S. Huppert
*Assistant Examiner*—Edward M. Wacyra
*Attorney, Agent, or Firm*—Dirk J. Veneman; Raymond W. Campbell

[57] ABSTRACT

An improved screen plate for a pressure screening apparatus and a method for making the basket are disclosed wherein prestressed areas are provided at each end of each slot formed in the screen plate for minimizing crack propagation.

19 Claims, 3 Drawing Sheets

WEAR SCREEN PLATE AND METHOD OF MANUFACTURE THEREOF

BACKGROUND OF THE INVENTION i. Technical Field

The present invention pertains to improvements in pulp screening apparatus, and pertains particularly to an improved screen basket for use in pressure screens which has increased wear life, as compared to similar screen baskets known heretofore.

ii. Prior Art

Screens are used to separate acceptable papermaking fiber from unacceptable constituents of a slurry of pulp fiber in preparing the wood fiber for the papermaking process. In typical wood pulp screens, a slurry of pulp flows through a perforate cylindrical screen plate or basket which may be smooth, or which may have a contoured surface facing toward the stock flowing through the screen, to increase the effective screening area. It is known to utilize different hole, slot or hole and slot combinations for optimizing screening performance. To aid in passing the acceptable pulp through the screen plate, and to reduce plugging, pulsations are generated in the slurry, such as by passing a hydrofoil-shaped member past the screen plate. It is also known to use blunt, turbulence generating members on a screen rotor, to agitate the stock along the screen surface and improve screening efficiency. U.S. Pat. No. 4,855,038 discloses a pulp screen rotor which generates both turbulence and pulse for improved screening efficiency To provide sufficient strength to the screen plate, which generally is a basket-shaped member surrounding the rotor, to withstand the pressures experienced in the pressurized screen, and to increase the screening capacity by presenting increased screening area, it has been the accepted practice to provide a thickly-walled screen plate which is machined to present the desired surface. Such machining is a time-consuming and expensive process. As a result of the manufacturing restrictions in the machining process, which are imposed at least in part by the machine tools themselves, the total available open accepts flow area in the screen plate has been limited, and the final shape of the screen plate has been a compromise between the limitations of machining and the desired optimum screening shape.

Since the machined screen plates are a single, integral piece, wear or damage in a small area has required replacement of the entire screen plate; including the screening surfaces, mounting surfaces, and support members. When the wear or damage occurs prematurely, the expense of operating such a screen increases significantly.

In co-pending application U.S. Ser. No. 07/206,151, filed Jun. 10, 1988, now U.S. Pat. No. 4,954,249 a modular screen basket is disclosed wherein relatively thin sheet-like material is formed into the desired shape or contour. Stamping, pressing, and bending techniques are taught to form the screen plate, which does not require machining. The holes or slots are taught to be created during, before, or after formation of the undulations in the sheet-like material, with suggested forming techniques including laser beam cutting and punching. Utilizing a punch die as part of the forming process is suggested as a simplified, cost-effective manner for forming the openings.

While laser beam cutting as disclosed in U.S. Ser. No. 07/206,151 made possible the formation of slots of various configurations heretofore unavailable through machining, in the use of baskets having slots formed in that manner, it was found that laser cutting left a rough edge on the cut line, which promoted basket plugging. Chemical polishing of the cut surface was not totally satisfactory in solving the problem. Also, laser cutting with the chemical polishing proved to be quite expensive.

Lancing the thin sheet material used for the baskets is a more economical process, but was found to result in the formation of tiny cracks at the end of the lanced slot. During fatigue testing, the minute cracks formed during lancing propagated, potentially causing premature basket failure. Modification of the lancing tool, including the provision of radii at each end of the lanced slots, and numerous attempted slot configuration modifications proved unsatisfactory in controlling crack propagation.

SUMMARY OF THE INVENTION

It is a primary object of the present invention to provide a screen basket structure which minimizes crack propagation in thin basket material.

It is another object of the present invention to provide a manufacturing method for thin-walled, formed screen baskets which reduces crack formation in the screen basket during creation of the screen openings.

Another object of the present invention is to provide a method for manufacturing formed, thin-walled screen baskets with localized treatment at regions of slot ends to control crack formation and propagation through prestressing of the basket material.

These and other objects are achieved in the present invention by providing a screen basket in which an area is prestressed or coined at each end of the slots formed in the basket. The method is performed in conjunction with the material forming apparatus for bending relatively thin-walled sheet material into an undulating pattern, which apparatus has a shearing station for lancing slots in the material. The coining is performed at locations corresponding to the slot ends to minimize crack generation and propagation. Preferably, coining takes place prior to formation of the slot, and may be used with slot formation procedures other than shearing or punching.

Further objects and advantages of the present invention will become apparent from the following detailed description and the accompanying drawings.

DETAILED DESCRIPTION OF THE PREFERRED EMBODIMENT

Figure 1:
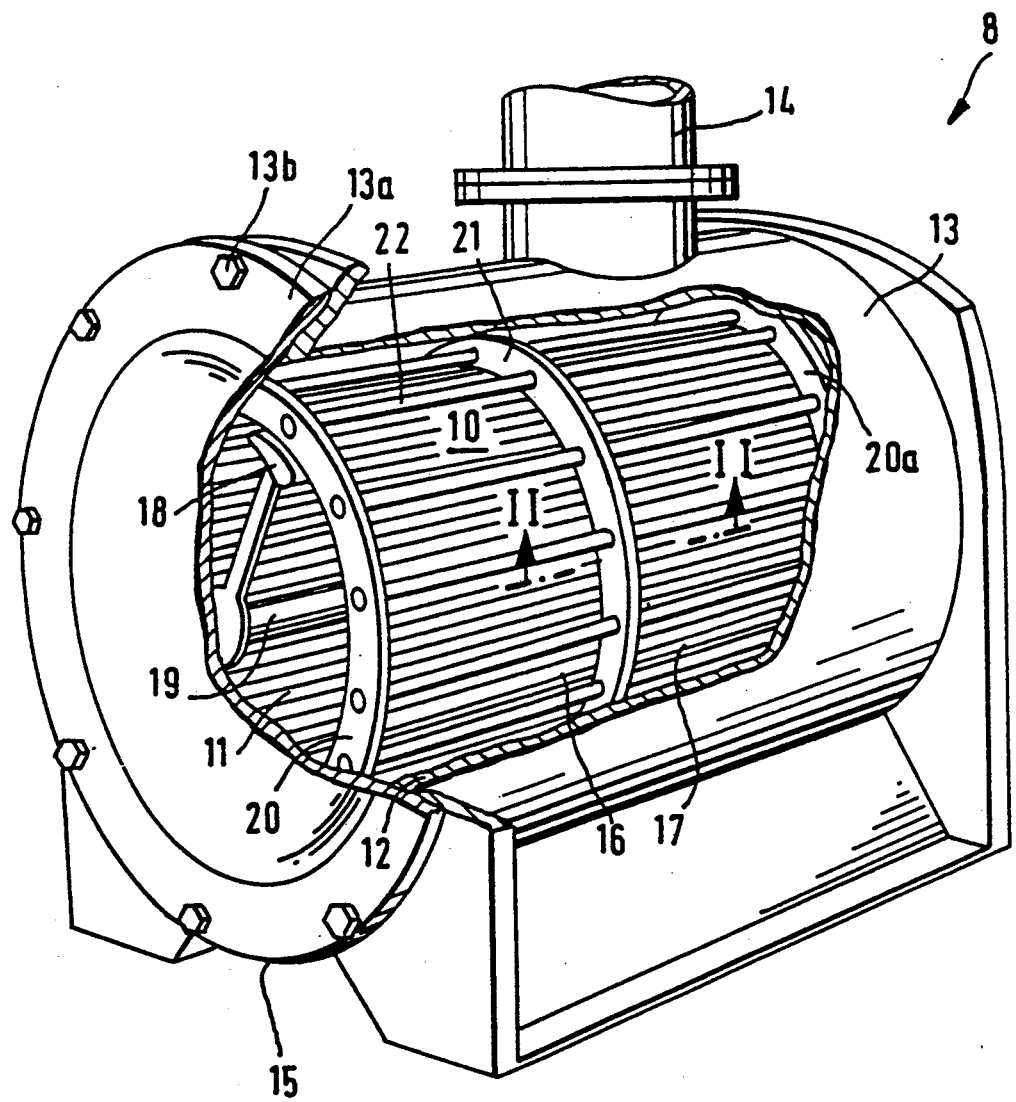
FIG. 1 is a perspective view, with portions broken away, illustrating a pulp screen structure utilizing a modular screen basket made of thin, sheet-like material formed into an undulating configuration, manufactured according to the present invention to provide increased wear life.

Referring now more specifically to the drawings, and to FIG. 1 in particular, numeral 8 designates a screening apparatus wherein previously treated pulp is screened to remove foreign elements such as shives, bark, knots, dirt, glass, plastic, and the like. A screen plate assembly is shown at 10, and defines in the apparatus 8 an interior chamber 11 where the pulp slurry to be screened enters the apparatus, and an exterior chamber 12 where the screened pulp slurry flows out of the apparatus after passing through the screen plate assembly. The assembly is enclosed in a housing 13 which includes an end plate 13a secured by bolts 13b. The housing has an inlet, not shown, for admitting of pulp into the interior chamber 11, and an outlet, not shown, leading from the chamber 11 for the foreign material to flow out of the apparatus, which foreign material has not passed through the screen plate assembly 10 from the interior chamber 11 to the exterior chamber 12. The accepted pulp, which has flowed from the interior chamber 11 through the screen plate assembly 10 to the exterior chamber 12 flows out of the screen apparatus 8 through an accepts outlet 14.

The screen plate assembly 10 is stationary within the housing 13, and, for aid in passing the pulp slurry through the screen plate, and to help inhibit plugging, hydrofoils 18 are mounted for rotation within the cylindrical screen plate assembly. The hydrofoils 18 are supported on arms of a rotary-driven shaft 19 which rotates in a clock-wise direction, as viewed in FIG. 1. The hydrofoils shown are merely illustrative of a suitable type, and it should be understood that the present invention can be used for screen plates of various types for various pulse, turbulence, and combination pulse and turbulence generating rotors.

The screen plate assembly 10 includes cylindrical screen sections 16 and 17 which, without support, are essentially flexible, would not withstand normal screen pressures. The screen sections, therefore, require rigidifying or strengthening for use in the pressurized environment of screen apparatus 8. The necessary support and strengthening is provided by end rings 20 and 20a, and an intermediate support ring 21. Each of the rings has grooves, such as illustrated by the grooves 23 and 24 in the ring 21 shown in FIG. 2. The grooves 23 and 24 are circular, to hold the screen sections in a substantially cylindrical shape. The grooves 23 and 24 have a radial dimension substantially equal to the radial thickness of the shaped, undulating screen plates.

The screen plates are formed from relatively thin material compared to the heretofore known machined screen plates. The thin material is formed into various shapes or contours, generally undulated, so as to present a substantial amount of screening area to the stock.

During assembly, each of the shaped screen plates is positioned into the grooves in the end rings 20 or 20a and the intermediate ring 21, and the rings are pulled together to force the screen plates into the grooves. For this purpose, axially extending rods 22 are provided, spaced circumferentially from each other, and the rods are provided at their ends with threads and nuts 22a, so that the nuts can be tightened to pull the end rings towards each other and force the ends of the screen plates into the grooves. The grooves are preferably tapered so that the slot becomes narrower in an inward direction toward the bottom of the groove. When the rods are tightened, the screen plates are pushed tightly into the tapered grooves, so that the screen plates are held firmly in a fixed position circumferentially. It should be recognized that the screen assemblies can be made of different lengths, longer or shorter, or even greater in number and additional reinforcing intermediate rings, such as 21, may be employed between the ends of each of the adjacent screens.

Figure 2:
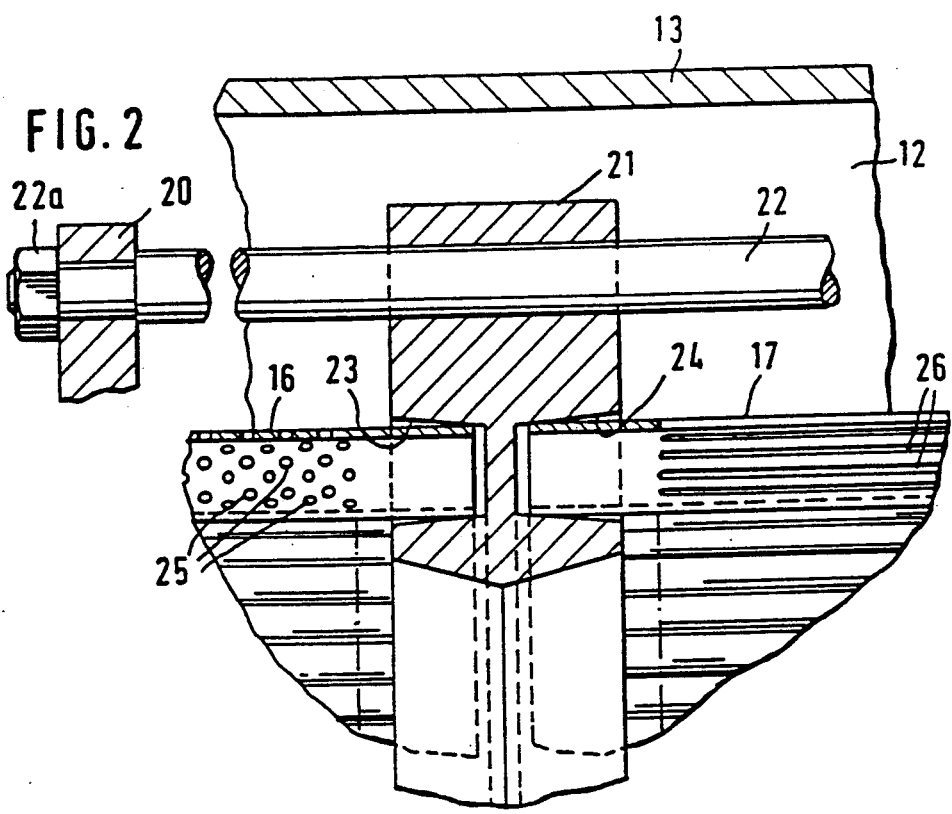
FIG. 2 is an enlarged, fragmentary sectional view taken substantially along line II—II of FIG. 1.

Screen openings such as holes 25 or slots 26, as shown in FIG. 2, extend through the thin, sheet-like screen material, providing a path from the interior chamber 11 to the exterior chamber 12.

The thin material of the screen sections may be stainless steel or similar sheet material which is formed in a generally cylindrical shape having undulations extending around the circumference of the screen. In a simplified form, the undulations may take the form of a series of upright and inverted U-shaped sections 27 and 28, or, in other words, the screen essentially consists of a series of deep corrugations. A suitable apparatus and method for forming the corrugations can be found in co-pending U.S. Ser. No. 07/206,151.

Figure 4:
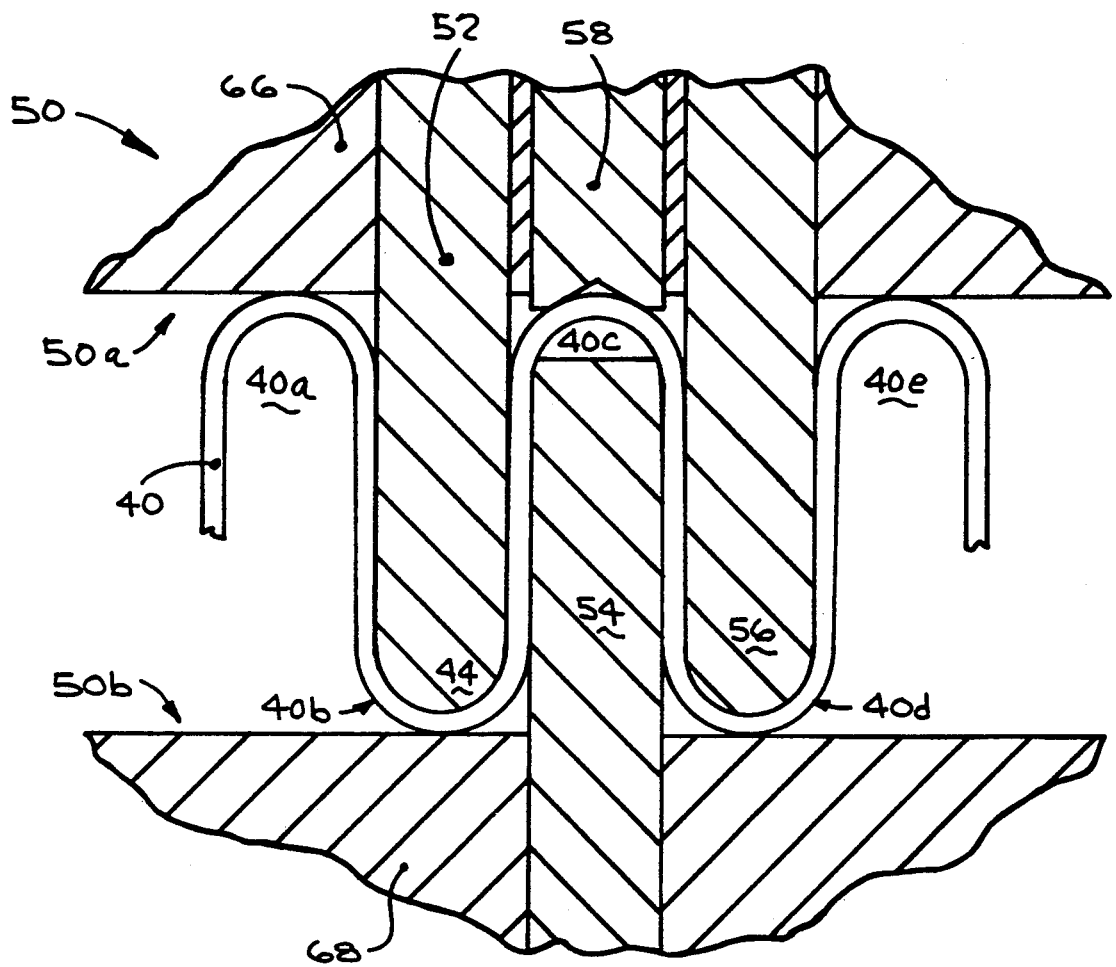
FIG. 4 is a cross-sectional view through an apparatus for forming the coined areas in the screen basket section of the present invention.

As part of the forming process when a slot 26 or other form of elongated opening is made, and before the slots are lanced or punched in the screen plate, the plates are selectively coined at the location for the slot ends, to inhibit crack formation and propagation. FIG. 4 illustrates an acceptable apparatus for coining the screen plate. After the undulations have been formed, the screen plate material 40 having corrugations 40a, b, c, d, and e enters the coining station 50, which includes complementary sections 50a and 50b having support and positioning members 52, 54, and 56 for positively locating the sheet material for coining by engaging corrugations on either side of the corrugation being coined. A coining pin 58 is located opposite the support member 54. Members 52 and 56 and coining pin 58 are held in a backing member 66 of section 50a, and member 54 is held in a backing member 68 of section 50b.

Figure 5:
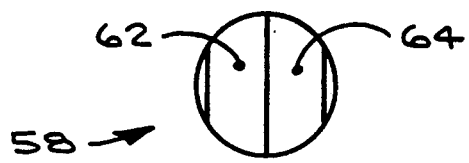
FIG. 5 is a plan view of the tip of one of the coining pins of the apparatus shown in FIG. 4.

The coining pin is essentially rod-like, with a beveled depression at the end thereof which contacts and prestresses the screen plate material in a precisely located region by depressing or dimpling the material 40 as the sections 50a and 50b close towards each other. As shown in FIG. 5, the tip of the coining pin 58 includes inwardly tapering surfaces 62 and 64 which define a V-shaped trough, inverted in orientation as shown in FIG. 4. While other shapes may be used for the end of the coining pin, the inverted V has been found to be advantageous in that it positively engages the material being coined, without wandering over the surface during the coining operation.

The coining pin 58 may be axially actuable relative to the support and positioning members 52, 54, and 56, so that, after the material is accurately located as shown in FIG. 4, the coining pin is actuated to depress the material downwardly toward the support finger 54. Alternatively, the coining pin 58 may be located such that depression and coining of the material occurs as the coining station 50 reaches its closed position, or backing member 66 may be yieldable, allowing movement of the member 66 relative to the support member 54.

Figure 3:
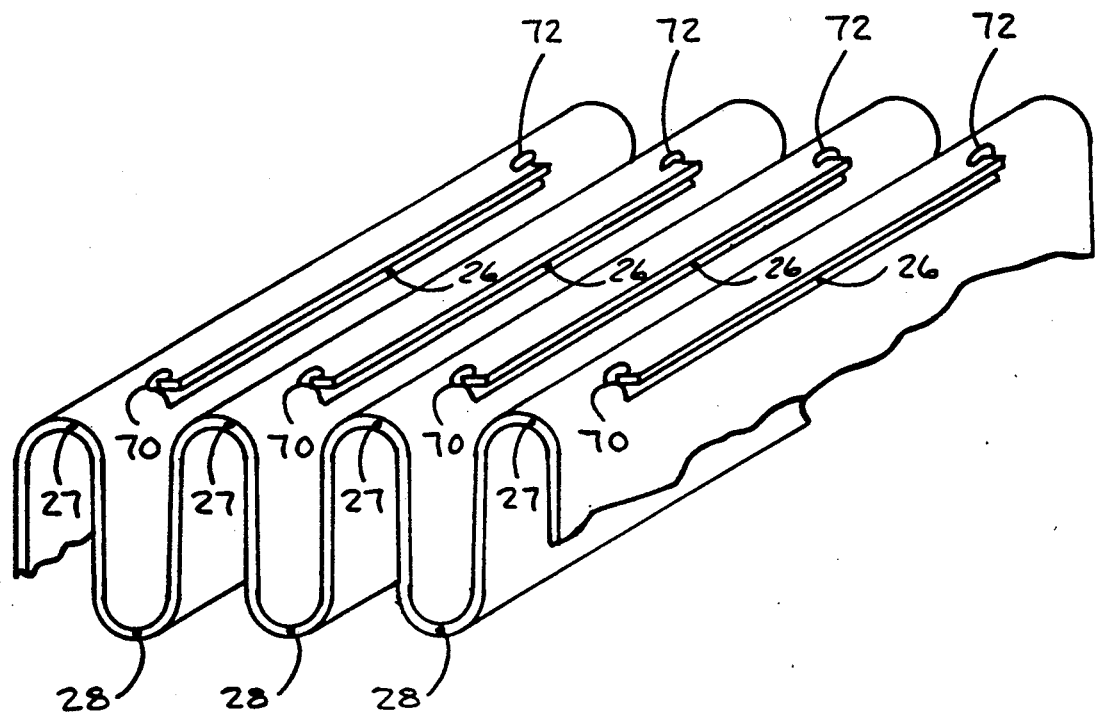
FIG. 3 is an enlarged, fragmentary view of a section of a screen basket, illustrating the areas of coining at the slot ends in accordance with the present invention.

It has been found that the coined area, or indentation formed, should be at least about five times greater in width than the width of the slot to be formed. A minimum depth of the coined area should be about 0.015 inch. As shown in FIG. 3, coined areas 70 and 72 are provided at each end of each of the slots 26 formed in the screen plate material, with the slot ends being generally centrally located in the prestressed area.

It should be recognized that, when a series of slots 26 are to be formed along the length of a corrugation of the sheet material, a plurality of coining pins may be provided, one behind the other, and suitably spaced so that two or more coined areas may be formed in one step. It is also possible to incorporate two or more rows of coining pins, so that locations on more than one corrugation can be coined at one time. In a suitable apparatus for performing the coining, when more than one coining pin is utilized, advantageously the pins will be adjustable in spacing to accommodate slot lengths of various dimension.

It is preferred that the coining is performed prior to formation of the slot. Coining has been found to be particularly advantageous when used with the sheared or punched slots, as described in co-pending U.S. Pat. No. 4,954,249, but may also be utilized when laser cutting or other slot formation techniques are used.

When done in a press-type arrangement as shown herein, location of the coined areas can be precisely controlled, as can the intensity of the coining operation. This has advantages over other methods of prestressing the sheet material, such as shot peening, which is more difficult to control and which may not treat the entire region surrounding a slot end.

While an improved wearing screen basket, a method for forming slotted baskets and a suitable apparatus for performing the method have been shown and described in detail herein, it should be recognized that various changes may be made without departing from the scope of the present invention.

We claim:

1. A screen plate for use in paper pulp pressure screening apparatus, comprising in combination:
   a screen formed of a relatively thin sheet-like material of substantially uniform thickness therethrough, said material being formed into an undulating shape and having screening openings formed therethrough, and said formed sheet material being shaped as a cylinder;
   said screening openings being elongated slots formed in the material; and
   coined areas formed at each end of each slot, each coined area comprising a limited region in which the material is prestressed for minimizing crack formation and propagation.

2. A screen plate for using in paper pulp pressure screening apparatus as defined in claim 1, in which said coined area is at least about 5 times greater in width than the width of said slot.

3. A screen plate for use in paper pulp pressure screening apparatus as defined in claim 2, in which said coined area comprises a depression of at least about 0.015 inch in depth.

4. A screen plate for use in paper pulp pressure screening apparatus as defined in claim 1, in which said coined area comprises a depression of at least about 0.015 inch in depth.

5. In a screen plate assembly for use in a pressure screening apparatus, wherein a screen plate section is formed of relatively thin sheet-like material shaped into an undulating pattern and elongated slots are provided in the relatively thin material for the passage of slurry therethrough, the improvement comprising:
   discrete coined areas provided at each end of each slot, with the slot ends being located within the coined area for minimizing crack formation and propagation.

6. The improvement in a screen plate for use in paper pulp pressure screening apparatus as defined in claim 5, in which said coined area is at least about 5 times greater in width than the width of said slot.

7. The improvement in a screen plate for use in paper pulp pressure screening apparatus as defined in claim 6, in which said coined area comprises a depression of at least about 0.015 inch in depth.

8. The improvement in a screen plate for use in paper pulp pressure screening apparatus as defined in claim 5, in which said coined area comprises a depression of at least about 0.015 inch in depth.

9. In a method for making a screen plate for a pressurized pulp screen apparatus wherein relatively thin sheet-like material is formed into an undulating pattern and shaped into a generally cylindrical shape, and elongated openings are created through said material, the improvement comprising:
   coining a discrete area for each end of each of the openings created through the material.

10. The improved method for making a screen plate, as defined in claim 9, wherein said coining step is performed prior to the step of creating the opening through the material.

11. The improved method for making a screen plate, as defined in claim 9, including depressing the relatively thin sheet-like material at least about 0.015 inch.

12. The improved method for making a screen plate, as defined in claim 11, in which said coining step is performed over an area having a width at least about 5 times the width of the opening created in the relatively thin sheet-like material.

13. The improved method for making a screen plate, as defined in claim 12, wherein said coining step is performed prior to the step of creating the opening through the material.

14. The improved method for making a screen plate, as defined in claim 9, in which said coining step is performed over an area having a width at least about 5 times the width of the opening created in the relatively thin sheet-like material.

15. A method for forming a pressurized pulp screen basket comprising the steps of:
   bending relatively thin sheet-like material into an undulating pattern;
   coining discrete, spaced regions on the material; and
   creating slot-like openings in the sheet material, each of said slot-like openings extending from one coined region to an adjacent coined region.

16. The method of forming a screen basket as defined in claim 15, in which said coining step is performed before said step of creating slots.

17. In a method for forming a slotted screen basket for pressurized pulp screens, the improvement comprising:
   prestressing discrete regions of the screen basket at each of the ends of slots in the screen basket.

18. In a slotted screen basket for use in pressurized pulp screens, the improvement comprising:
   a discrete, prestressed area provided at each end of each slot in the basket.

19. In the improved screen basket as defined in claim 18, the further improvement wherein the prestressed area is in width about 5 times the width of the slot of the basket.

* * * * *